United States Patent
Chen et al.

(10) Patent No.: US 9,087,262 B2
(45) Date of Patent: Jul. 21, 2015

(54) SHARPNESS ESTIMATION IN DOCUMENT AND SCENE IMAGES

(75) Inventors: Francine Chen, Menlo Park, CA (US); Jayant Kumar, College Park, MD (US)

(73) Assignee: FUJI XEROX CO., LTD., Tokyo (JP)

( * ) Notice: Subject to any disclaimer, the term of this patent is extended or adjusted under 35 U.S.C. 154(b) by 548 days.

(21) Appl. No.: 13/293,845

(22) Filed: Nov. 10, 2011

(65) Prior Publication Data

US 2013/0121610 A1 May 16, 2013

(51) Int. Cl.
*G06K 9/40* (2006.01)
*G06T 7/00* (2006.01)

(52) U.S. Cl.
CPC ........... *G06K 9/40* (2013.01); *G06T 7/0002* (2013.01); *G06T 2207/30176* (2013.01)

(58) Field of Classification Search
None
See application file for complete search history.

(56) References Cited

U.S. PATENT DOCUMENTS

2010/0086206 A1* 4/2010 Hong .......................... 382/168

OTHER PUBLICATIONS

P. Narendra, A Separable Median Filter for Image Noise Smoothing, IEEE 1980.*

"Live Image Quality Assessment Database", http://live.ece.utexas.edu/research/quality/subjective.htm, Sep. 17, 2010, (Retrieved Nov. 8, 2011).

Christopher F. Batten, "Autofocusing and Astigmatism Correction in the Scanning Electron Microscope", University of Cambridge, Aug. 2000.

John Canny, "A Computational Approach to Edge Detection", IEEE Transactions on Pattern Analysis and Machine Intelligence, Nov. 1986, pp. 679-698, vol. PAMI-8, No. 6.

Yun-Chung Chung, et al. "A Non-Parametric Blur Measure Based on Edge Analysis for Image Processing Applications", 2004 IEEE Conference on Cybernetics and Intelligent Systems, Dec. 1-3, 2004, pp. 356-360.

Rony Ferzli, et al., "A No-Reference Objective Image Sharpness Metric Based on the Notion of Just Noticeable Blur (JNB)", IEEE Transactions in Image Processing, Apr. 2009, pp. 717-728, vol. 18, No. 4.

Pina Marziliano, et al., "A No-Reference Perceptual Blur Metric", Proceedings of the 2002 International Conference on Image Processing, 2002, pp. 57-60.

Niranjan D. Narvekar, et al. "An Improved No-Reference Sharpness Metric Based on the Probability of Blur Detection", IEEE, International Workshop on Quality of Multimedia Experience, 2009, pp. 87-91.

Eeping Ong, et al., "A No-Reference Quality Metric for Measuring Image Blur", IEEE, Seventh Interational Symposium on Signal Processing and its Applications, 2003, pp. 469-472.

Xiang Zhu, et al., "A No-Reference Sharpness Metric Sensitive to Blur and Noise", First International Workshop on Quality of Multimedia Experience (QoMEX), Jul. 2009.

Xiang Zhu, et al., A No-Reference Image Content Metric and its Application to Denoising, Image Processing (ICIP) 2010 17th IEEE International Conference, Sep. 2010.

* cited by examiner

*Primary Examiner* — Mark Roz
(74) *Attorney, Agent, or Firm* — Sughrue Mion, PLLC

(57) ABSTRACT

Systems and methods described herein are directed to estimating the sharpness of images or photos such as document pages or scenes. The systems and methods are based on calculating a difference in grayscale values between pixels at an edge of an image. The differences may be accomplished by taking a slope of grayscale values between two pixels at an edge window, and estimating the edge sharpness based on the slope, multiple slopes, or differences in the slopes.

15 Claims, 8 Drawing Sheets

SHARPNESS ESTIMATION IN DOCUMENT AND SCENE IMAGES

BACKGROUND

1. Field

The exemplary embodiments described herein are generally directed to estimating sharpness, and more specifically, to estimating sharpness in document and scene images.

2. Related Art

With the proliferation of cameras on mobile devices, an ever-increasing number of photos are taken. Related art cameras capture a burst of images, in order to bracket camera settings or to capture an action shot. As the number of digital photos and the automatic processing of digital photos increases, there is a need for methods to assess the perceived blurriness of an image.

When photobooks are generated, image blurriness can be determined and the least blurry image can be selected from several similar images. Additionally, the size of the image in the photobook can be scaled so that the blurrier images are smaller. As mobile phones become more intertwined with other applications, there is a need for quickly assessing the blurriness of images, for focusing as well as for the other applications. Sharpness can be determined in computer vision tasks such as detecting shadows, which often have less sharp edges, and in identifying in-focus and out-of-focus areas of an image.

In the related art, cameras may capture document images on scenes. Taking photos of document pages as an alternative to scanning is becoming more feasible, as the resolution of mobile phones has improved. However, the estimating of sharpness/blurriness for photos of textual document pages is not adequately addressed by related art sharpness determination measures. From the user side, it may be difficult to determine whether a photo is well-focused on a mobile screen. Thus, there is an unmet need for a real-time method for estimating sharpness on a mobile phone.

When taking a photo, there may be different causes of blur. FIG. 1 illustrates blurring 101, 102 due to the motion of the camera relative to the object 100 being photographed. Here, object 100 is a document image. This blurring effect can be further accentuated when taking close-up photos, as shown in FIG. 2. The photo 200 is of a single page; the closer characters 201, 202 are less blurry than the far characters 203, 204.

Sharpness estimation is used in related art photo processing applications, such as selection, display, printing, restoration, and enhancement. Related art methods have been specifically proposed for estimating the sharpness/blurriness of a photo of a natural scene. However, photos of document pages have different characteristics than photos of natural scenes. Thus, the sharpness measures developed for natural scenes may not necessarily produce the same result for photos of document pages primarily composed of text.

Related art sharpness/blurriness measures require a "perfect" reference image for comparison. Such related art methods are used for evaluating the degradation of image quality due to various types of processing. Related art no-reference methods are for evaluating the sharpness of a photo for a single scene and across scenes without a reference image.

Related art no-reference methods are applied to all pixels in the image. No-reference methods are based on statistical characteristics of the pixel values in an image, including variance, autocorrelation, and kurtosis. Histograms of various measures may include histograms of grayscale levels, entropy of the gray levels, and Discrete Cosine Transform (DCT) coefficients in 8×8 blocks. Related art methods may also be based on the image power spectrum, band-pass filtering, and wavelets. One such related art method is the Gradient Method, which is based on relative grayscale values (the difference in grayscale values between two pixels). The Gradient Method computes the average of the gradient values over the entire image as a measure of sharpness. Various fixed offsets between pixels have also been proposed where the Gradient Method was used.

Other related art methods have focused on the edge pixels identified using an edge detector, such as the Canny edge detector. These edge-based approaches do not use a reference image. In these related art methods, the width of an edge is measured by counting the number of pixels with increasing grayscale values in one direction of the edge pixel, while counting the number of pixels with decreasing grayscale values in the other direction. The width is computed as the sum of both counts, excluding the edge pixel. Thus, the estimate of edge width is quantized to pixel widths (number of pixels). This is a relatively coarse estimate, especially in images with many high contrast and rapid transitions (such as text documents), where a transition often occurs in three pixels or less.

Another related art method is directed to edge pixels, and computes the standard deviation of the gradient magnitude profile of the edge to be combined as a weighted average with the magnitude of the edge.

SUMMARY

Aspects of the exemplary embodiments include an apparatus, which includes an apparatus, which involves a camera that captures an image; a smoothing unit that generates at least one smoothed image based on the captured image over at least one of an x-axis direction and a y-axis direction; an identifying unit that identifies a first window comprising a first plurality of pixels around an edge pixel of the at least one smoothed image and a second window in the captured image. The second window includes a second plurality of pixels around an edge pixel of the captured image and corresponding to the first plurality of pixels in the first window. The apparatus may further involve an estimating unit that estimates edge sharpness by determining differences in grayscale value between first pairs of pixels from the first window and second pairs of pixels from the second window over at least one of an x-axis direction and a y-axis direction of each of the first window and the second window.

Additional aspects of the exemplary embodiments include a non-transitory computer readable medium storing instructions for execution by a processor. The instructions may include receiving a captured image; generating at least one smoothed image of the captured image over at least one of an x-axis direction and a y-axis direction; identifying a first window including a first plurality of pixels around an edge pixel of the at least one smoothed image and identifying a second window in the captured image including a second plurality of pixels around an edge pixel of the captured image, and corresponding to the first plurality of pixels in the first window; and estimating edge sharpness by determining differences in grayscale value between first pairs of pixels from the first window and second pairs of pixels from the second window over at least one of an x-axis direction and a y-axis direction of each of the first window and the second window.

Additional aspects of the exemplary embodiments include a method, which involves utilizing a camera to capture an image; generating at least one smoothed image of the captured image over at least one of an x-axis direction and a y-axis direction; identifying a first window including a first plurality of pixels around an edge pixel of the at least one smoothed image and identifying a second window in the captured image including a second plurality of pixels around an edge pixel of the captured image, and corresponding to the first plurality of pixels in the first window; and estimating edge sharpness based on determining differences in grayscale value between first pairs of pixels from the first window and second pairs of pixels from the second window over at least one of an x-axis direction and a y-axis direction of each of the first window and the second window.

BRIEF DESCRIPTION OF THE DRAWINGS

These, and or/other aspects will become more readily appreciated from the following description of the embodiments, taken in conjunction with the accompanying drawings, in which.

DETAILED DESCRIPTION

The exemplary embodiments provide systems and methods for effectively estimating the sharpness of photos of document pages as well as natural scenes.

The exemplary embodiments employ one of two grayscale-based methods for estimating the sharpness of images composed mostly of text, as well as natural scenes. The methods can be performed locally at the mobile device but is not limited thereto.

Figure 1:
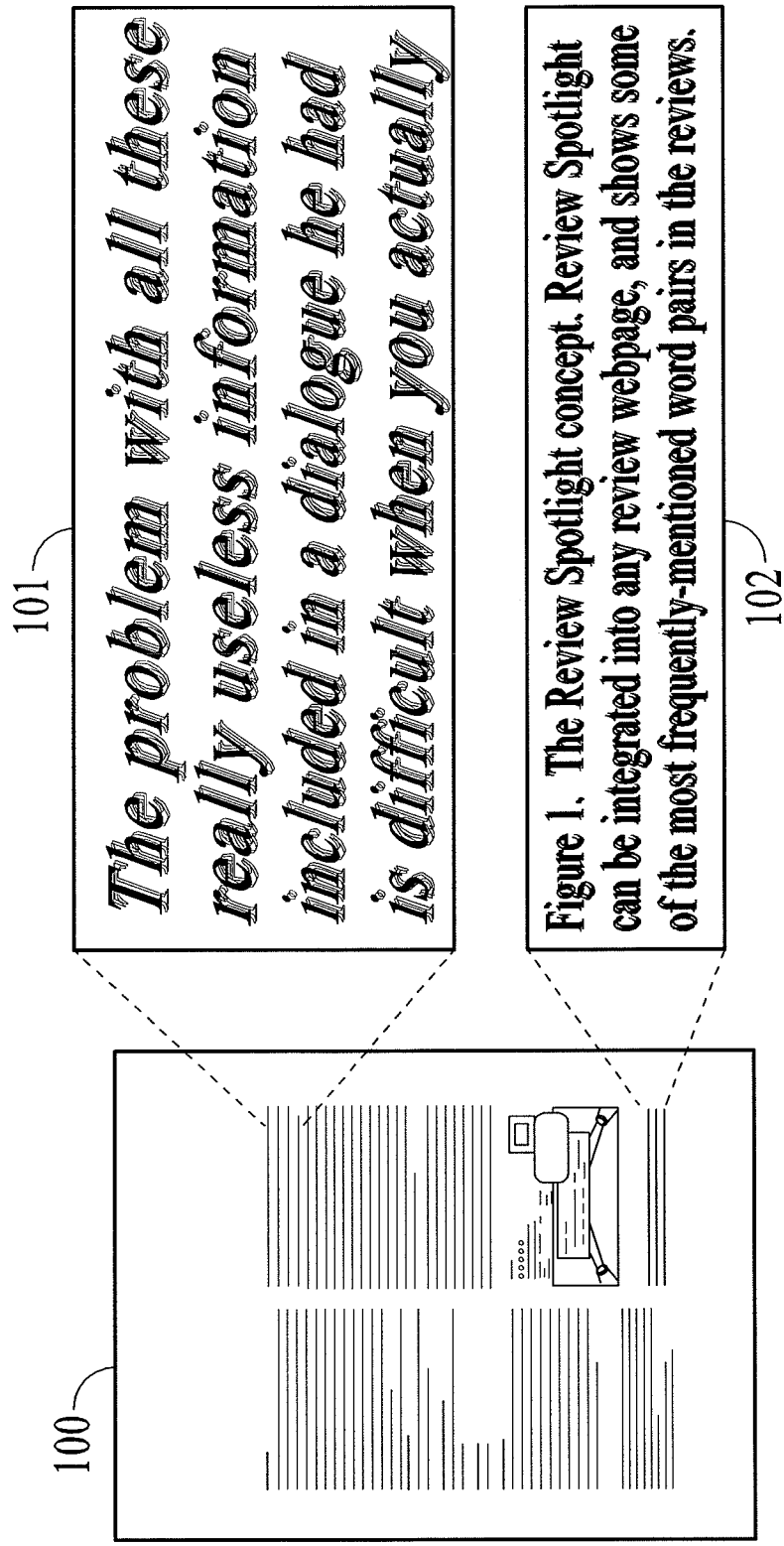
FIG. 1 illustrates blurring due to the motion of the camera relative to the object being photographed.
Figure 2:
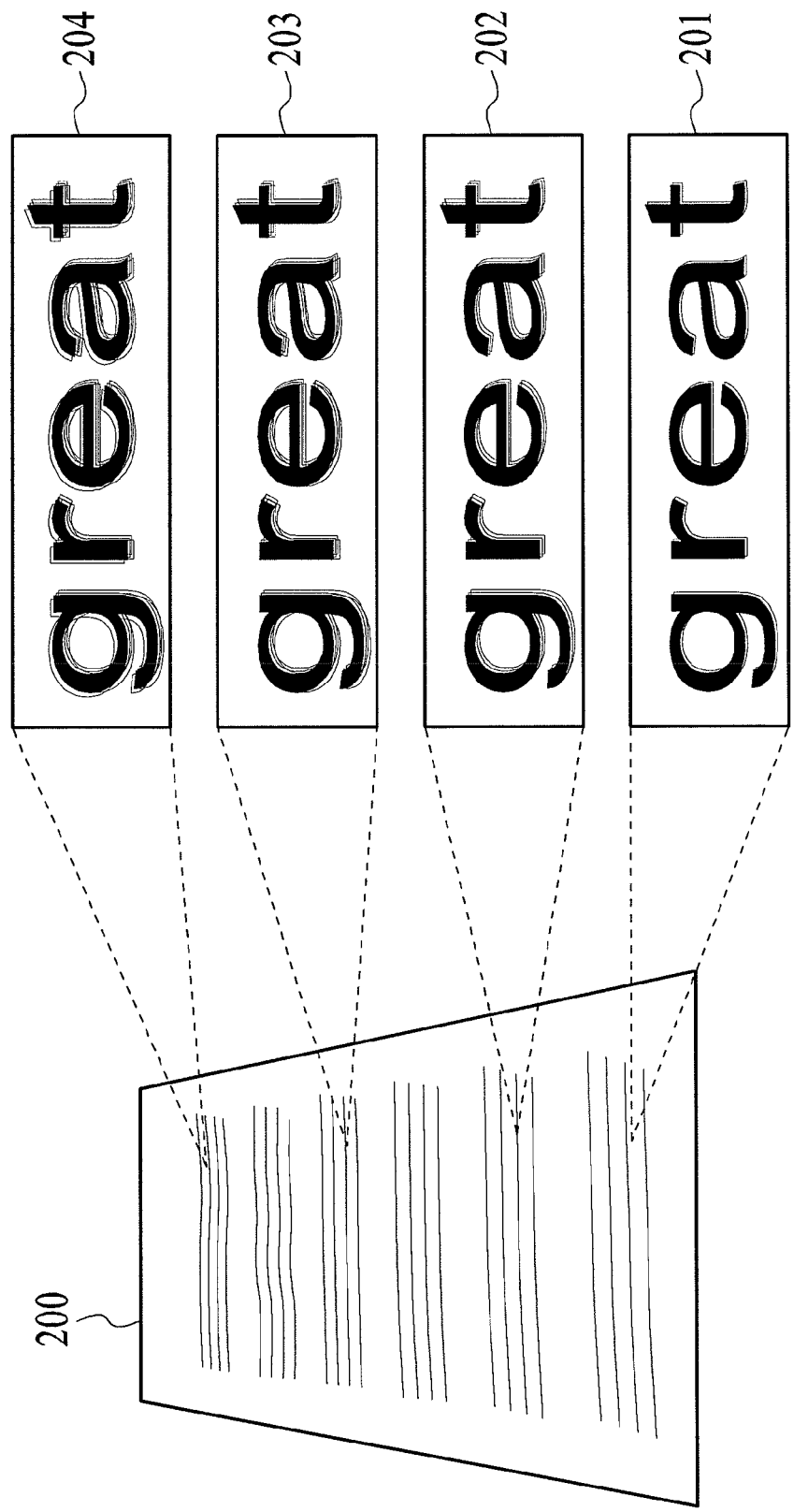
FIG. 2 illustrates blurring in a close up of a photo.
Figure 3:
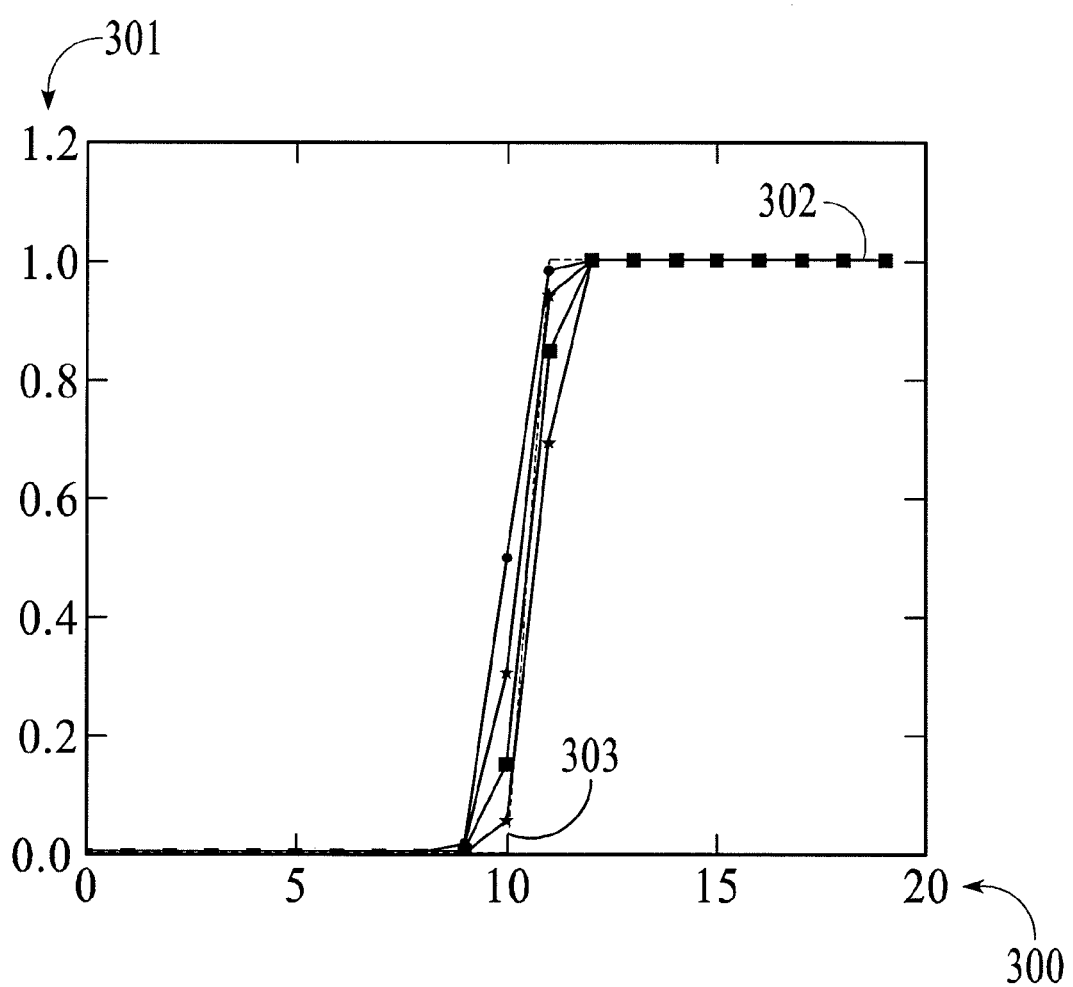
FIG. 3 illustrates a relationship between pixel width and grayscale value in accordance to an exemplary embodiment.

FIG. 3 illustrates a relationship between pixel width and grayscale value in accordance with an exemplary embodiment. As a simple simulation of a row of pixels in a captured digital image with some blurring, a step function was convolved with a Gaussian window of length five. Four sets of pixels 302 are selected for the simulation. The pixel width 300 of each set is plotted against the grayscale value 302 of each individual pixel in the set. The step function is shown by the dotted line 303. The four solid lines correspond to the results when the step function is shifted four different amounts (i.e., offsets of 0, 1, 2, and 3 pre-windowed points). Note that the edges are two or three pixels in width, and that for a given width, the sharpness of the edge varies. Thus the edge width may have a different value depending on the location of the underlying edge during digitization. Using edge width as a measure of sharpness is only a rough estimate.

The exemplary embodiments focus on the differences in grayscale pixel values to estimate sharpness. Two different models are utilized by the exemplary embodiments as follows:

(1) maxDoM: In this model, the slope of an underlying edge is modeled by a linear model. From this model, the exemplary embodiments can utilize a measure that indirectly estimates edge width. This measure is referred herein as the 'maximum Difference of Medians (maxDoM).

(2) ΔDoM: In this model, the underlying edge is non-linear and can be modeled by a non-parametric model to determine the derivative, or difference of the differences of grayscale values at an edge. From this model, the exemplary embodiments utilize a measure that captures the rate of the slope change. For example, the slope changes quickly within an edge window as a characteristic of sharp edges. This measure is referred as the 'difference of the Difference Of Medians' (ΔDoM).

Figure 4:
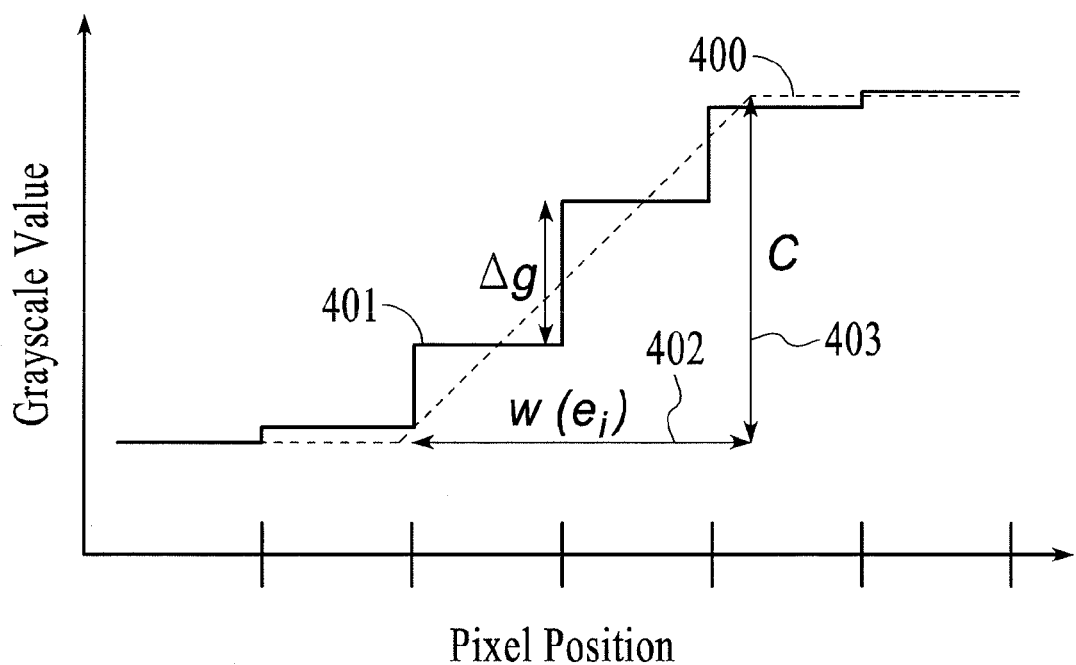
FIG. 4 illustrates a model where blur width is related to the differences in grayscale values between adjacent pixels with the use of contrast in a linear fashion, in accordance with an exemplary embodiment.

FIG. 4 illustrates a model application of maxDoM where blur width is related to the differences in grayscale values between adjacent pixels by utilizing the contrast values of pixels in a linear fashion, in accordance with an exemplary embodiment. The maxDom model is applied based on the simplifying assumption that an underlying edge can be approximated relatively well by a linear model. An edge is approximated by a linear model 400 and represented in an image by the pixel grayscale values 401 that correspond to that edge. The width estimated by counting pixels is four, while the true width of the linear edge 402 is $w(e_i)$, or slightly more than two pixels. The contrast 403 of the edge is C. Note that the slope of the edge is the ratio of the contrast, C, and $w(e_i)$. The slope can be estimated directly if the difference between the grayscale values of two adjacent pixels, Δg, that lie completely within the edge is known. The difference is estimated as $$\frac{\Delta g}{w_p}$$

where $w_p$ is the width of one pixel. But if the edge is narrower, as it is in many text documents, then the slope may be difficult to calculate.

Figure 5:
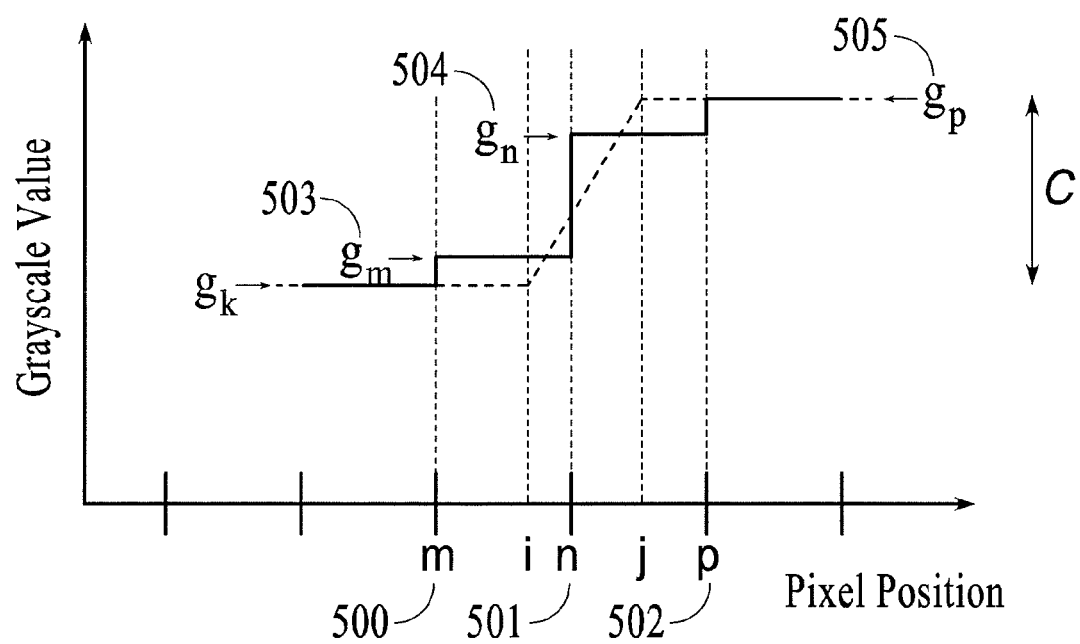
FIG. 5 illustrates a model where blur width is related to the differences in grayscale values between adjacent pixels with the use of contrast in a non-linear fashion, in accordance with an exemplary embodiment.

FIG. 5 illustrates a model application of ΔDoM where blur width is related to the differences in grayscale values between adjacent pixels by utilizing the contrast values of the pixels in a non-linear fashion, in accordance with an exemplary embodiment. In FIG. 5, the locations m at 500, n at 501, and p at 502 define the locations of pixels spanning $\overline{mn}$ and $\overline{np}$. The grayscale values of these two pixels are $g_m$ and $g_n$, as shown at 503 and 504, respectively, The grayscale value at the peak is $g_p$ as shown at 505. The slope can be estimated from $g_k$, $g_m$, $g_n$, $g_p$, and the width of the pixels, $w_p$. However, the resulting equation for the slope is a 3rd order polynomial, which is difficult to solve quickly.

To determine a computationally faster method to compute the slope, the exemplary embodiments consider two cases: (1) wherein the edge width, measured as the number of adjacent pixels increasing/decreasing, is at least four pixels and (2) wherein the edge width is less than four pixels wide. For the first case, when an edge spans at least four pixels, the maximum change in grayscale levels, $\Delta g_{max}$ between adjacent pixels is equal to Δg, assuming no noise in the image. Thus in case (1), identifying the slope can be computed directly from the maximum change in grayscale levels around the edge. A window of pixels (e.g. 13 pixels) can be used around the edge.

For case (2), solving a 3rd order polynomial would be slow. Instead, the exemplary embodiments use the maximum slope, $\Delta g_{max}$, as an approximate measure that may underestimate sharpness. In reference to FIG. 3, the first difference of the edge values vary depending on the offset, but the difference of two pixels apart is less variable. When the results are compared by using the difference of one pixel apart and the difference of two pixels apart, the resulting slope when a difference of two pixels apart was used may be more representative of the sharpness.

According to an alternate exemplary embodiment, it is also possible to assign any edge less than four pixels wide a maximal sharpness value, or use the quantized values. Although the distinction between edges less than four pixels wide will be lost, these edges will be sharp and independent of the local contrast. Thus, this approximation can be applied to estimate overall image sharpness by counting the number of sharp edges.

To compute ΔDoM, differences with an offset of two are used. In the x (horizontal) direction, ΔDoM is:

$$\Delta Dom_x(i,j) = [I_{i+2,j} - I_{i,j}] - [I_{i,j} - I_{i+2,j}] \quad (1)$$

where $I_{i,j}$ is the grayscale value of a pixel located at i,j in an image that has been median-filtered.

The change in slope, ΔDoM, will be greater for sharp edges, since sharp edges transition to and from a larger slope more quickly. The absolute value of the difference of differences is taken to determine whether the slope changes quickly.

Edge width is inversely proportional to slope in both maxDom and ΔDoM. The change in slope, ΔDoM, is a discrete version of the second derivative. By integrating the second derivative, or for our discrete model, summing ΔDoM, a measure that is inversely proportional to edge width can be obtained.

To integrate over the absolute value, the sum is broken into two parts. Assuming that an edge is a monotonic set of values, the sum can be broken at the inflection point of the edge. For a positive slope, the change in slope is positive until the inflection point, I, of the slope, and negative after I. The slope is thereby approximated in the horizontal direction by using two separate computations of the integral of the difference of differences, for each side of the inflection point:

$$\sum_{I-w \le i \le I} |\Delta DoM_x(i,j)| + \sum_{I \le i \le I+w} |\Delta DoM_x(i,j)|. \quad (2)$$

An analogous computation can be performed in the vertical direction.

Sharpness estimation is performed separately for the x and y directions. Related art systems disclose that only one direction is adequate, but better performance may be achieved in documents by combining both of the x and y directions. This can be attributed to the frequent horizontal and vertical strokes in text. To identify edges quickly, the image is filtered with a 1-D filter (e.g. a 1-D Sobel filter, etc.) or the gradient is computed in either the x or y direction. The location of values greater then a threshold are chosen to identify edges, rather than a smooth transitions, are noted. In this example, the gradient is computed and a threshold of 0.0001 is used. The contrast is estimated using a window of size 2w±1 around each identified edge:

$$C(i) = \sum_{i-w \le k \le i+w} |s_k - s_{k-1}| \quad (3)$$

where i is the index at an edge location, $s_k$ is the value of a Sobel-filtered pixel and w is a parameter representing window size. In this example, the parameter is set to 6.

In related systems, the ratio of blur width to the Just Noticeable Blur (JNB) is a critical term to determining whether an edge appears blurry. This ratio can be expressed in terms of contrast, C, and the change in grayscale over one pixel, Δg. The value of Δg can be computed from the slope, a, and pixel width, $w_p$, as $\Delta g = a \ast w_p$. FIG. 4 illustrates that the ratio of the contrast of an edge to the blur width is the same as the ratio of the change in contrast over one pixel to the width of one pixel. Since Δg measures the change in grayscale values over one pixel, it can be expressed as:

$$\frac{C}{\Delta g} = \frac{w(e_i)}{1}. \quad (4)$$

Note that neither C nor Δg are quantized, which gives a more accurate estimate of blur width than estimating by counting pixels.

The perceptually-based criterion for blur is:

$$\frac{w(e_i)}{w_{JNB}(e_i)} > T \quad (5)$$

where $w_{JNB}$ is the Just Noticeable Blur width of edge $e_i$.

By using the grayscale-based measure of the exemplary embodiments to replace $w(e_i)$, the following equation is yielded:

$$\frac{C}{\Delta g \ast w_{JNB}(e_i)} > T \quad (6)$$

Related systems quantize $\sigma_{JNB}$ values obtained from human judgments to $w_{JNB}$ values of 5 and 3 for contrast≤50 and contrast≥51, respectively. This quantization is relatively coarse. From experimental simulation, a fitted value of $\sigma_{JNB}$ can be used in place of $w_{JNB}$. Fitting the Contrast vs $\sigma_{JNB}$ values from experimental simulation results in $\sigma_{JNB} \approx C^{-.6}$, and substituting into equation 6:

$$\frac{C}{\Delta g \ast C^{-.6}} > T \quad (7)$$

$$\frac{C^{1.6}}{\Delta g} > T \quad (8)$$

C can be computed directly by identifying the grayscale values at the peak and valley of the edge.

A faster approximate alternative is to use the sum of the gradient instead of $C^{1.6}$ This guarantees that the value of maxDoM and Δg will range from 0 to 1.

The two sharpness measures, maxDoM and ΔDoM, are defined below for an edge pixel.

To compute sharpness, the DoM values are normalized by an estimate of the contrast. The contrast can be computed by taking the difference in grayscale values across the edge width. For speed, the sum of the absolute values of the gradient is used:

$$\Sigma_{i-w \le m \le i+w} |G_x(m,j)|$$

MaxDoM-based sharpness in the x direction at a pixel located at (i,j) in an image, $S_x(i,j)$, is computed as:

$$S_x(i, j) = \frac{max_{i-w \leq m \leq i+w} |DoM_x(m, j)|}{\Sigma_{i-w \leq m \leq i+w} |G_x(m, j)|} \quad (9)$$

and in the y direction as:

$$S_y(i, j) = \frac{max_{j-w \leq n \leq j+w} |DoM_y(i, n)|}{\Sigma_{j-w \leq n \leq j+w} |G_y(i, n)|} \quad (10)$$

The ΔDOM-based sharpness in the x direction at a pixel located at (i,j) in an image, $S_x(i,j)$, is computed as:

$$S_x(i, j) = \frac{\Sigma_{i-w \leq m \leq i+w} |\Delta DoM_x(m, j)|}{\Sigma_{i-w \leq m \leq i+w} |G_x(m, j)|} \quad (11)$$

and in the y directions as:

$$S_y(i, j) = \frac{\Sigma_{j-w \leq n \leq j+w} |\Delta DoM_y(i, n)|}{\Sigma_{j-w \leq n \leq j+w} |G_y(i, n)|} \quad (12)$$

In equations 8-12, w is a fixed number, e.g., 7. Alternatively, the sum can be over other windows around an edge pixel. For example, instead of summing from i−w to i+w, (j−w to j+w), the sum can be over the edge width.

To estimate the sharpness of an image, the edge pixel sharpness estimates need to be combined. In related systems, the image is divided into blocks and blocks with at least about 0.2% of the pixels identified as an edge pixel using a Sobel edge detector are identified as edge blocks. The perceived blur in a region, R, is then computed as:

$$P_{blur}(R) = 1 - \exp\left(-\sum_{e_i \in R} \left|\frac{w(e_i)}{w_{JNB}(e_i)}\right|^\beta\right)^{\frac{1}{\beta}} \quad (13)$$

And the probability of detecting blur in the image, I, is:

$$P_{blur}(I) = 1 - \prod_{R \in I} (1 - P_{blur}(R)) \quad (14)$$

In the exemplary embodiments, an edge pixel is declared sharp if the blur width ratio is less than a threshold, T, as in the test for blurriness shown in Equation 7. The sharpness in one direction (e.g., x or y) for either a region or the entire page is computed as:

$$S_x = \frac{\#sharpPixels_x}{\#edgePixels_x} \quad (15)$$

The sharpness in the x and y directions are combined using a Frobenius norm:

$$Sharpness = \sqrt{S_x^2 + S_y^2} \quad (16)$$

A faster alternative is to compute:

$$Sharpness = \frac{\#sharpPixels_x + \#sharpPixels_y}{\#edgePixels_x + \#edgePixels_y} \quad (17)$$

An evaluation and comparison was conducted between the two methods with the top-performing (perceptually-based) Just Noticeable Blur (JNB) method and Cumulative Probability of Blur Detection (CPBD) method from the related art. For the comparison, each method was evaluated on a paired document image data set. A corpus of document page images taken using smart phones was constructed and labeled, which is referred to as the Document Sharpness corpus. Users of different mobile phones sent five photos of the same document page taken from magazines, technical articles etc. A total of 27×5=135 images were collected from users of various mobile phones.

From the five shots of a document page submitted by a user, $$\binom{5}{2} = 10$$

image-pairs were created, for a total of 270 image-pairs. For each image-pair, 25 human evaluators identified the sharpest (most in focus) image of the pair. Defining the ground truth as the majority label, the average agreement across the evaluators with the ground truth was 85.1%. The 343 labels by the seven human evaluators with an average agreement less than 70% were removed, resulting in 21-25 judgments per image-pair, which results in average agreement with the ground truth of 85.7%.

Since the task is a 2-way forced choice, average accuracy is used as the evaluation measure. For a given method, the sharpness scores computed by the method for each pair of images was compared; and the predicted sharper image was compared to the labeled ground truth. For document sharpness, MaxDoM performed similarly to JNB, which performed better than CPBD, and ΔDoM performed better than all tested methods, as shown in tables 1 and 2.

TABLE 1

Accuracy (%) in predicting the sharpest image of a pair of images for the four tested methods

| Data set | JNB | CPBD | maxDoM | ΔDoM |
| --- | --- | --- | --- | --- |
| Document Sharpness | 73 | 51 | 61 | 83 |
| LIVE (Gaussian Blur) | 100 | 99 | 97 | 97 |

TABLE 2

| Data set | Correlation Method | JNB | CPBD | maxDoM | ΔDoM |
| --- | --- | --- | --- | --- | --- |
| Document Sharpness | Spearman | 38 | 42 | 52 | 79 |
| LIVE (Gaussian Blur) | Pearson | 84 | 91 | 89 | 87 |
| | Spearman | 84 | 94 | 92 | 89 |

Evaluations were further conducted by utilizing the Gaussian-blurred subset of the LIVE dataset that was used in related art to evaluate blurriness in JNB and CPBD. The LIVE contains images blurred using a 2-D Gaussian filter with kernel values ranging from 0.42 to 15 pixels. Results are shown for the four methods on the two data sets in Table 1. On the LIVE data set, all systems—JNB, CPBD, maxDoM and ΔDoM—performed well in predicting the sharper image.

Evaluations were further conducted by comparing the actual scores against the Mean of Subjects (MOS) scores that are provided with the LIVE database. As used in the related art, Pearson's correlation was calculated to measure how well the metric values correlate with the MOS values and Spearman rank-order correlation was computed as a prediction of monotonicity. These results are shown in Table 2. ΔDoM demonstrated high Spearman correlation on the Document Sharpness data set, relative to the other measures. On the LIVE data set, ΔDoM and maxDoM were intermediate in correlation performance relative to JNB and CPBD. Thus for estimating an absolute sharpness value overall, ΔDoM has better overall accuracy.

Evaluations were further conducted to determine the average time needed to process one image in each data set from using the different methods. The MatLab code for the methods were used. The computation times for the different methods are shown in Table 3.

TABLE 3

Time Performance (secs per image) for the four tested methods implemented in MatLab.

| Data set | JNB | CPBD | maxDoM | ΔDoM |
|---|---|---|---|---|
| Document Sharpness | 36 | 28 | 1.8 | 2 |
| LIVE (Gaussian Blur) | 2.51 | 1.54 | 0.26 | 0.27 |

Note that our ΔDom and maxDoM are one to two orders of magnitude faster than JNB and CPBD. Unlike the JNB and CPBD method, the methods of the exemplary embodiments do not require computing multiple time-consuming exponentials and roots (refer to equations 13 and 14), Canny edge detection, or finding the width of an edge.

Figure 6:
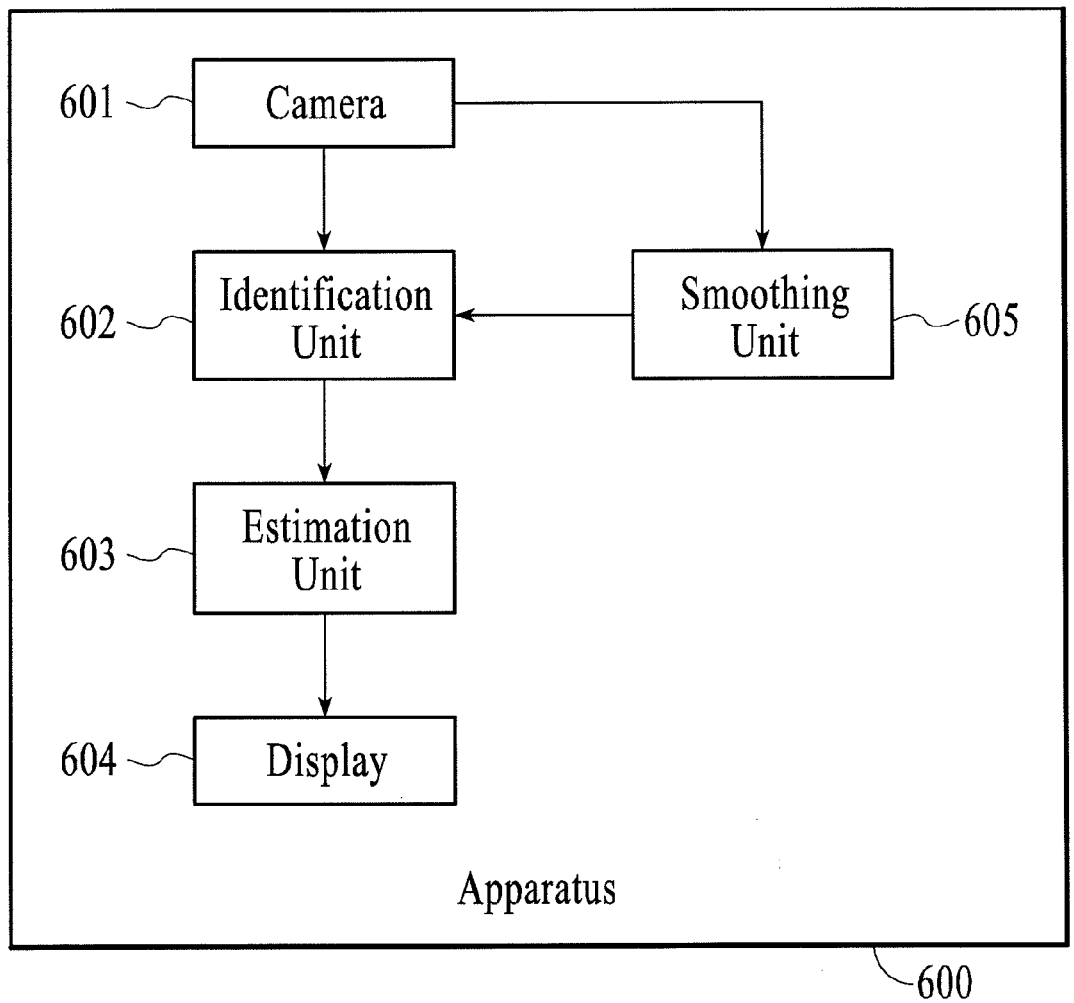
FIG. 6 illustrates an exemplary functional diagram in accordance with an exemplary embodiment.

FIG. 6 illustrates a functional diagram implementation in accordance with an exemplary embodiment. The apparatus 600 may include a camera 601, an identification unit 602, an estimation unit 603, a display 604, and a smoothing unit 605. The camera 601 captures an image, which is processed by the identification unit 602 to identify a first window with a first plurality of pixels around an edge pixel of the at least one smoothed image and to identify a second window corresponding to the first window in the captured image with a second plurality of pixels around an edge pixel of the captured image and corresponding to the first plurality of pixels. The smoothed image is generated by a smoothing unit 605, which generates at least one smoothed image of the captured image over at least one of an x-axis direction and over a y-axis direction. The smoothing unit may generate the smoothed image by utilizing a smoothing technique or a filter such as a median filter as described above, over a direction of the captured image. Alternatively, the smoothed image can be generated on the fly for the pixels in the identified window of the captured image so that only the pixels of the window are smoothed. The estimation unit 603 estimates edge sharpness based on determining differences in grayscale value between first pairs of pixels from the first window and second pairs of pixels from the second window over at least one of an x-axis direction and a y-axis direction of the first window and the second window.

The estimated sharpness value may be indicated on a display 604, for example, by sorting images by sharpness, by indicating sharpness scores for images, or other methods.

Figure 7:
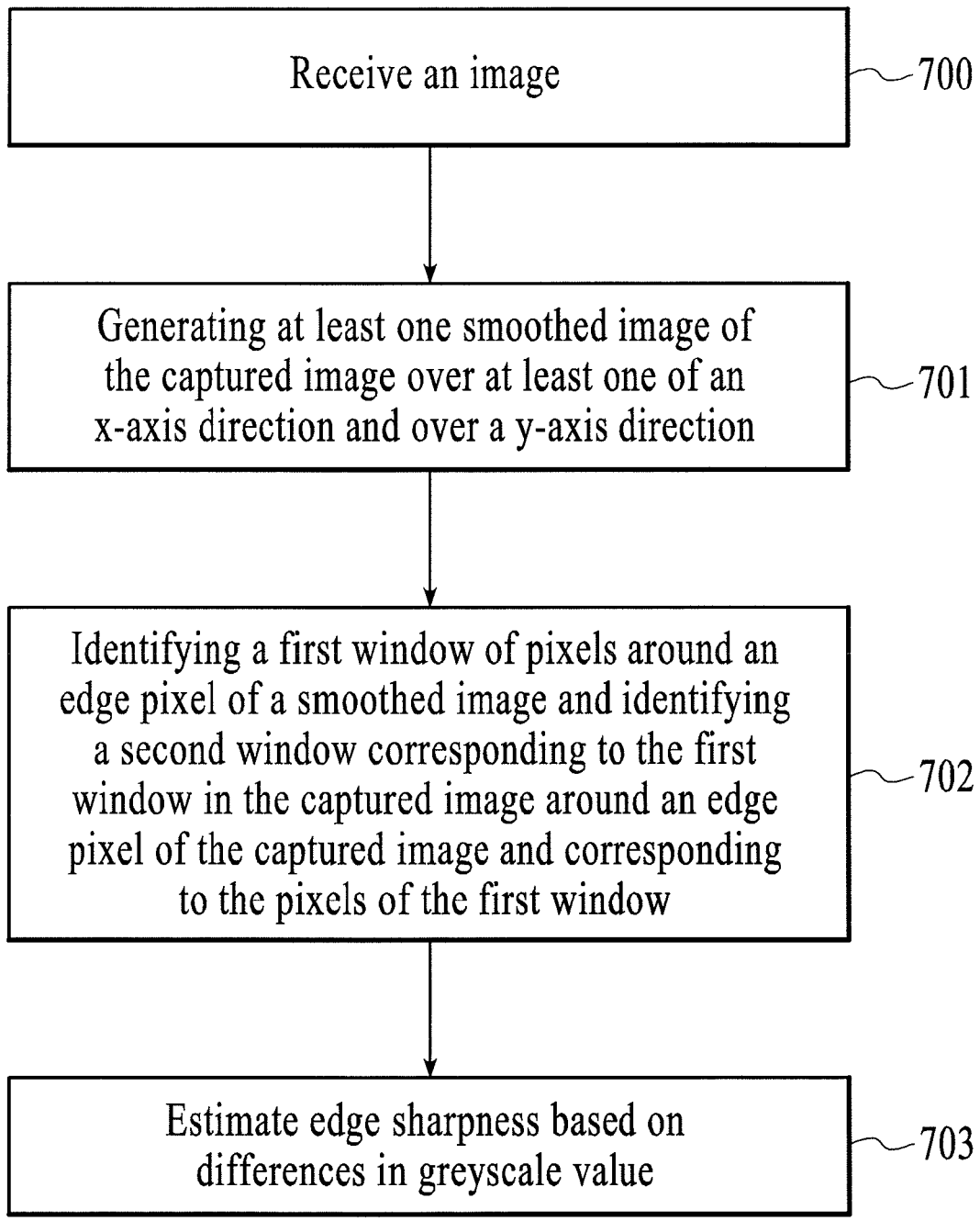
FIG. 7 illustrates an exemplary flowchart in accordance with an exemplary embodiment.

FIG. 7 illustrates an exemplary flowchart in accordance with an exemplary embodiment. An image is received 700, which may be smoothed to generate a smoothed image in either the x-direction or the y-direction 701. A smoothed image may also be generated for both directions. Subsequently, a first window of pixels around an edge pixel of the smoothed image is identified, as well as a second window corresponding to the first window in the captured image, with pixels around an edge pixel of the captured image and corresponding to the pixels of the first window 702. From the identified windows, edge sharpness may be estimated based on differences in greyscale value 703.

Figure 8:
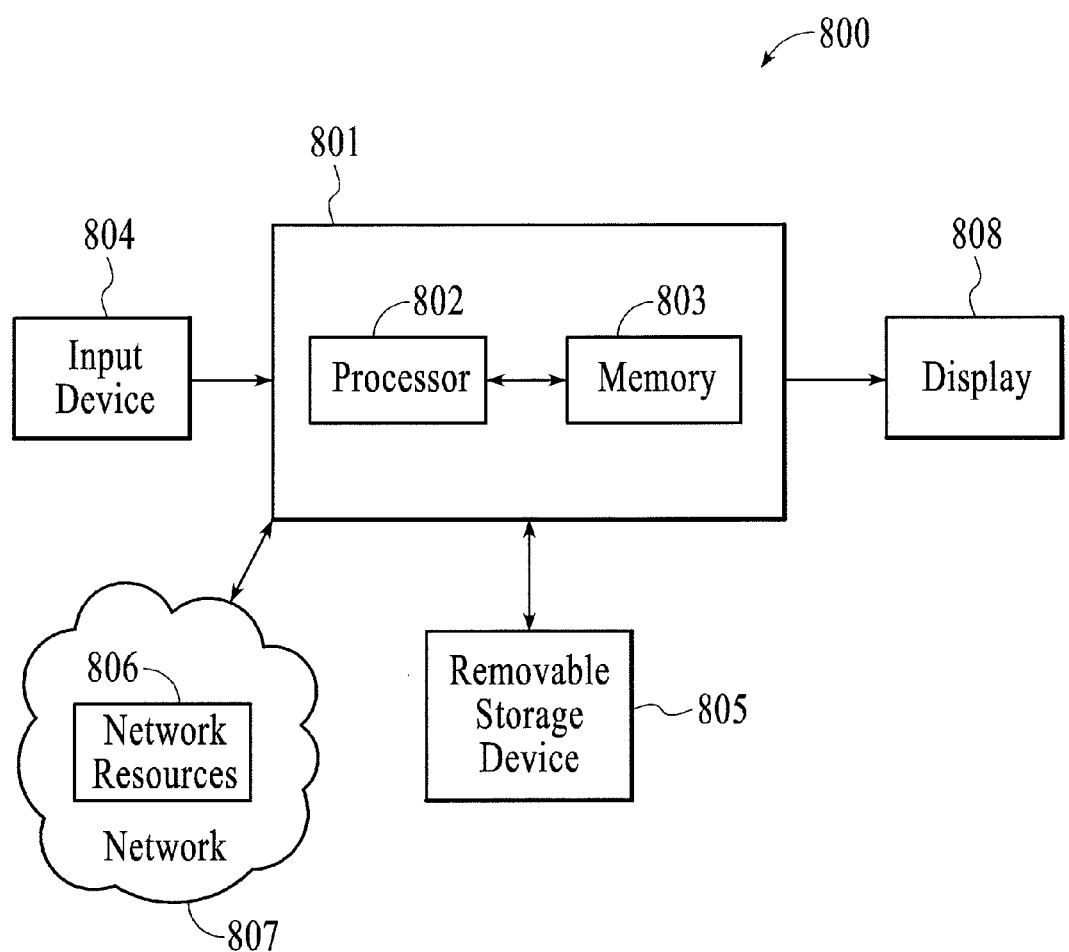
FIG. 8 is a block diagram that illustrates an embodiment of a computer/server system upon which an embodiment of the inventive methodology may be implemented.

FIG. 8 is a block diagram that illustrates an embodiment of a computer/server system 800 upon which an embodiment of the inventive methodology may be implemented. The system 800 includes a computer/server platform 801 including a processor 802 and memory 803 which operate to execute instructions, as known to one of skill in the art. The term "computer-readable medium" as used herein refers to any medium that participates in providing instructions to processor 802 for execution. Additionally, the computer platform 801 receives input from a plurality of input devices 804, such as a keyboard, mouse, touch device, multi-touch device, or verbal command. The computer platform 801 may additionally be connected to a removable storage device 805, such as a portable hard drive, optical media (CD or DVD), disk media or any other medium from which a computer can read executable code. The computer platform may further be connected to network resources 806 which connect to the Internet or other components of a local public or private network. The network resources 806 may provide instructions and data to the computer platform from a remote location on a network 807. The connections to the network resources 806 may be via wireless protocols, such as the 802.11 standards, Bluetooth® or cellular protocols, or via physical transmission media, such as cables or fiber optics. The network resources may include storage devices for storing data and executable instructions at a location separate from the computer platform 801. The computer interacts with a display 808 to output data and other information to a user, as well as to request additional instructions and input from the user. The display 808 may therefore further act as an input device 804 for interacting with a user.

Moreover, other implementations will be apparent to those skilled in the art from consideration of the specification and practice of the invention disclosed herein. Various aspects and/or components of the described embodiments may be used singly or in any combination. It is intended that the specification and examples be considered as exemplary only, with a true scope and spirit of the invention being indicated by the following claims.

What is claimed is:

1. An apparatus, comprising:
   a camera that captures an image;
   a smoothing unit that is configured to generate, using a processor, at least one smoothed image based on the captured image, over at least one of an x-axis direction and a y-axis direction;
   an identifying unit that is configured to identify, using the processor, a first window comprising a first plurality of pixels around an edge pixel of the at least one smoothed image, and a second window in the captured image comprising a second plurality of pixels around an edge pixel of the captured image, and corresponding to the first plurality of pixels in the first window; and
   an estimating unit that is configured to estimate, using the processor, edge sharpness by determining differences in grayscale value between first pairs of pixels from the first window and second pairs of pixels from the second window over at least one of an x-axis direction and a y-axis direction of each of the first window and the second window, wherein a number of pixels in the first window is smaller than a number of pixels in the at least one smoothed image, and a number of pixels in the second window is smaller than a number of pixels in the captured image, and wherein the estimating unit is configured to estimate a number of sharp pixels from the differences in grayscale value and generate an edge sharpness score based on a ratio of a number of sharp pixels in a region of the captured image comprising the second window, and a number of pixels in the region belonging to an edge of the captured image.

2. The apparatus of claim 1, wherein the estimating unit normalizes the differences in the grayscale values by a function of gradient values of pixels in the second window.

3. A non-transitory computer readable medium storing instructions for execution by a processor, comprising:

receiving a captured image;

generating at least one smoothed image of the captured image over at least one of an x-axis direction and a y-axis direction;

identifying a first window comprising a first plurality of pixels around an edge pixel of the at least one smoothed image;

identifying a second window corresponding to the first window in the captured image comprising a second plurality of pixels around an edge pixel of the captured image, and corresponding to the first plurality of pixels in the first window;

estimating edge sharpness by determining differences in grayscale value between first pairs of pixels from the first window and second pairs of pixels from the second window over at least one of an x-axis direction and a y-axis direction of each of the first window and the second window; and estimating a number of sharp pixels from the differences in grayscale value and generating an edge sharpness score based on a ratio of a number of sharp pixels in a region of the captured image comprising the second window and a number of pixels in the region belonging to an edge of the captured image, wherein a number of pixels in the first window is smaller than a number of pixels in the at least one smoothed image, and a number of pixels in the second window is smaller than a number of pixels in the captured image.

4. The non-transitory computer readable medium of claim 3, further comprising normalizing the differences in grayscale values by a function of gradient values of pixels in the second window.

5. A method, comprising:

utilizing a camera to capture an image;

generating, using a processor, at least one smoothed image of the captured image over at least one of an x-axis direction and a y-axis direction;

identifying a first window comprising a first plurality of pixels around an edge pixel of the at least one smoothed image;

identifying a second window corresponding to the first window in the captured image comprising a second plurality of pixels around an edge pixel of the captured image, and corresponding to the first plurality of pixels in the first window;

estimating edge sharpness by determining differences in grayscale value between first pairs of pixels from the first window and second pairs of pixels from the second window over at least one of an x-axis direction and a y-axis direction of each of the first window and the second window; and estimating a number of sharp pixels from the differences in grayscale value and generating an edge sharpness score based on a ratio of a number of sharp pixels in a region of the captured image comprising the second window, and a number of pixels in the region belonging to an edge of the captured image, wherein a number of pixels in the first window is smaller than a number of pixels in the at least one smoothed image, and a number of pixels in the second window is smaller than a number of pixels in the captured image.

6. The method of claim 5, further comprising normalizing the differences in the grayscale values by a function of gradient values of pixels in the second window.

7. The apparatus of claim 1, wherein the estimating unit is configured to estimate the edge sharpness by identifying a maximum difference of the differences in the grayscale value.

8. The apparatus of claim 1, wherein the estimating unit is configured to estimate the edge sharpness by summing the differences in the grayscale value between the first pairs of pixels and second pairs of pixels over the x-axis direction, and between the first pairs of pixels and the second pairs of pixels over the y-axis direction.

9. The apparatus of claim 1, wherein the smoothing unit is configured to generate the at least one smoothed image over the x-axis direction by utilizing a median filter over the x-axis for determining differences over the x-axis, and generates the at least one smoothed image over the y-axis direction by utilizing the median filter over the y-axis for determining differences over the y-axis.

10. The non-transitory computer readable medium of claim 3, wherein the estimating the edge sharpness further comprises identifying a maximum difference of the differences in the grayscale value.

11. The non-transitory computer readable medium of claim 3, wherein the estimating the edge sharpness further comprises summing the differences in the grayscale value between the first pairs of pixels and second pairs of pixels over the x-axis direction, and between the first pairs of pixels and the second pairs of pixels over the y-axis direction.

12. The non-transitory computer readable medium of claim 3, further comprising generating the at least one smoothed image over the x-axis direction by utilizing a median filter over the x-axis for determining differences over the x-axis; and generating the at least one smoothed image over the y-axis direction by utilizing the median filter over the y-axis for determining differences over the y-axis.

13. The method of claim 5, wherein the estimating the edge sharpness further comprises identifying a maximum difference of the differences in grayscale value over the x-axis direction and over the y-axis direction.

14. The method of claim 5, wherein the estimating the edge sharpness further comprises summing differences in grayscale value between the first pairs of pixels and second pairs of pixels over the x-axis direction and between the first pairs of pixels and the second pairs of pixels over the y-axis direction.

15. The method of claim 5, further comprising generating the at least one smoothed image over the x-axis direction by utilizing a median filter over the x-axis for determining differences over the x-axis; and generating the at least one smoothed image over the y-axis direction by utilizing the median filter over the y-axis for determining differences over the y-axis.

* * * * *